Oct. 15, 1929.  W. A. ABERG  1,732,209
LANDING GEAR
Filed May 31, 1928
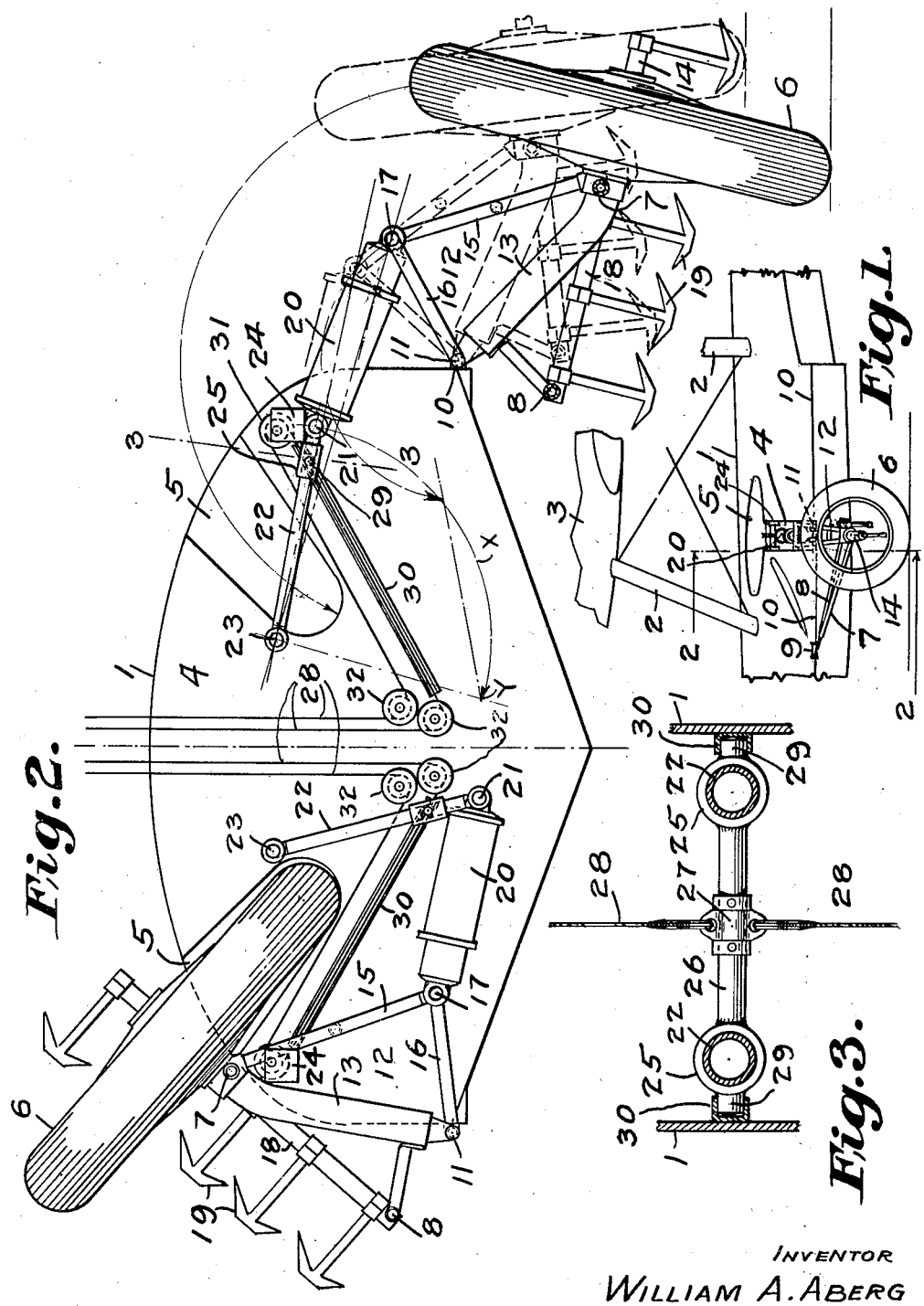
INVENTOR
WILLIAM A. ABERG
By Harold Dell.  ATTORNEY Patented Oct. 15, 1929

1,732,209

UNITED STATES PATENT OFFICE

WILLIAM A. ABERG, OF WASHINGTON, DISTRICT OF COLUMBIA

LANDING GEAR

Application filed May 31, 1928. Serial No. 281,850.

(GRANTED UNDER THE ACT OF MARCH 3, 1883, AS AMENDED APRIL 30, 1928; 370 O. G. 757)

This invention relates to retractable landing gear for flying machines, and more particularly to a gear for amphibian aircraft, or any type of flying machine that is to be used upon airplane carriers, floating docks, barges and like seagoing craft.

The object of my invention is to provide a gear of this type which has a reliable means for moving the gear from the active to the inactive position in a minimum amount of time.

In the types of landing gear that are at present used upon amphibian aircraft there is a tendency for the retractable wheels to collapse into the hull of the ship when any abnormal shock is imposed upon them in hard landings. This failure of operation of the landing gear at critical points is due to inadequate positioning means for stabilizing parts of the landing gear.

A further object of my invention is to eliminate this tendency of collapse and to produce a landing gear in which all moving parts of the retractable landing gear are in a positive locked condition when the landing gear is in operative position. With such a type of landing gear the limit of force which the landing gear will withstand is equal to the strength of the material in its construction.

My invention consists in the construction, combination and arrangement of parts as will be more fully hereinafter set forth as shown by the accompanying drawings and finally pointed out in the appended claims.

Reference is to be had to the accompanying drawings forming a part of this specification in which like reference characters indicate corresponding parts throughout the several views and in which:—

Figure 1 is a fragmentary side elevation of an amphibian airplane, showing the location of the landing gear in extended position.

Figure 2 is a diagrammatic vertical transverse section taken approximately on the line 2—2 of Figure 1, showing the various positions of the landing gear in both operative and inoperative position.

Figure 3 is a detail cross section taken on the line 3—3 of Figure 2 showing a means for attaching the control cable.

It is to be understood that the parts of the hull of the amphibian are shown diagrammatically only and may be varied to conform to any of the types of hull construction in common use. This diagrammatic hull forms no part of my invention but serves only as a basis for the description of the arrangement of the parts of the landing gear structure which is shown in detail.

Referring to Figure 1, numeral 1 designates a float which is connected by struts 2, to an airplane fuselage 3. This float is provided with a compartment 4, for housing portions of the mechanism, and which communicates with pockets 5 for receiving the landing wheels 6, when swung into inoperative or retracted position. This compartment 4 and the pockets 5 are separated from the interior of the float by conventional bulkheads and linings so that the float is watertight.

Bracing members 7 and 8 are pivotally connected at 9 to the chine 10 of the float, a suitable distance forward and in alignment with the pivot 11 of the wheel carrying frame 12. The rear ends of these braces are secured to portions of the landing wheel frame, and fold about their pivot with the wheel frame.

Referring to Figure 2, the wheel carrying frame 12, pivoted at or near the chine 10 is permitted to swing transversely of the float about the pivot 11, and consists of an axle member 13, which terminates in an axle 14 upon which the landing wheel 6 is mounted, brace struts 15, secured at their lower ends to the axle member 13 brace members 16 also secured at their lower ends by the axle connections to the pivot 11, both members 15 and 16 terminating in a pivot fitting at 17. An auxiliary frame member 18 is also carried by the frame 12 for supporting the axle hooks 19. These hooks are used when making landings upon retarding devices to bring the plane to a stop upon restricted landing areas.

The mechanism for securing the wheels in operative position, or for moving the wheel carrying frames 12 upward and inward for folding the landing wheels 6 into the pockets 5, consists of a shock absorbing member 20, having its outer end pivotally connected to the wheel carrying frame at 17, and its inner end connected at 21 to the free end of an arm 22 pivotally connected to the interior of the float structure at 23. This arm 22 receives the major portion of the force of impact transmitted through the frame 12 from the wheels when making a landing and carries it into the float at 23.

Abutment members 24 for receiving the vertical component of the force of impact transmitted through the frame 12 from the wheels when making a landing, are located just above a line of dead center between the arm pivot 23, and through the pivot 17 of the wheel frame when in operative position. The members 24 are secured to the sides of the compartment 4.

While I have shown the shock absorbing member 20, located between the pivot 17 and pivot 21, I have found that the member 20 will function equally as well if located between the pivot 17 and the axle member 13, in place of the brace 15 and a connecting arm or leg placed between the pivots 17 and 21. This alternative arrangement can be made within the scope of my invention without departing from the same.

Referring to Figure 3 the arms 22 are shown having movable blocks 25 and connected by cross member 26, and provided with centrally located cable fittings 27, to which a control cable 28 is attached.

The blocks 25 are provided with trunnions 29 that travel in guide channels 30 secured to the float structure to limit the deflection or sag which might otherwise cause the block 25 to bind on the arm 22 when the gear is being moved from the active to the inactive or from the inactive to the active position.

Referring again to Figure 2 it will be noted that the cable 28 is trained over a guide sheave 31 located at the upper outer edge of the float, and then carried under the sheaves 32, and upward and clear of the float to any conveniently located operating device (not shown) within the fuselage of the airplane.

A slight force exerted upon the cable 28 in one direction when the landing wheel is in operative position will hold the free end of the arm 22 against the abutments 24, and permit the full movement of the shock absorber to damp the force of impact received by the wheels 6 and transmit the remaining forces to the structure of the hull. This force being delivered at a point above the dead center line heretofore referred to will prevent the closing up of the linkage formed by the parts 20 and 22, when the device is in the operative position.

When the gear is to be retracted from the operative position shown at the right side of Figure 2, to the inoperative or retracted position shown at the left side of Figure 2, a force exerted upon the cable 28 in a direction opposite to that above mentioned, will slide the trunnions 29 along the guide 30, causing the arm 22 to travel downwardly and inwardly along the arc X to point Y, which will draw the shock absorber within the compartment 4. The movement of the shock absorbers into the compartment 4 swings the wheel frames 12 upwardly and inwardly about the pivot 10 for seating the wheels 6 in the pockets 5.

It will be understood that the above description and accompanying drawings comprehend only the general and preferred embodiment of my invention and that minor detail changes in the construction and of parts may be made within the scope of the appended claims without sacrificing any of the advantages of my invention.

The invention herein described may be manufactured and used by or for the Government of the United States for governmental purposes without the payment to me of any royalty thereon or therefor.

What I claim is:—

1. In a retractable landing gear for airplanes provided with a float, said float being provided with pockets for housing the landing wheels when in retracted position, the combination of frames hinged to the float, a wheel and axle upon each of the frames, and means for moving said frames upwardly and inwardly for folding said wheels into said pockets, said means consisting of shock absorbers, and means for moving said shock absorbers downwardly and inwardly into said float, said last mentioned means consisting of arms having one of their ends pivoted within said float, and the other of their ends pivoted to the inner ends of said shock absorbers, movable blocks upon said arms, a plurality of guide members for said blocks, and means for moving said said blocks along said guide members.

2. In a retractable landing gear for airplanes provided with a float, said float being provided with pockets for housing the landing wheels when in retracted position, the combination of frames hinged to the float, a wheel and axle upon each of the frames, and means for moving said frames upwardly and inwardly for folding said wheels into said pockets, said means consisting of shock absorbers and means for moving said shock absorbers downwardly and inwardly into said float, said last mentioned means consisting of arms having one of their ends pivoted to the inner ends of said shock absorbers, movable blocks upon said arms, a plurality of guide members for said blocks, and means for moving said blocks along said guide members, said means consisting of a cable.

3. In a retractable landing gear for airplanes provided with a float, said float being provided with pockets for housing the landing wheels when in retracted position, the combination of frames hinged to the float, a wheel and axle upon each of the frames, and means for moving said frames upwardly and inwardly for folding said wheels into said pockets, said means consisting of shock absorbers, and arms for moving said shock absorbers downwardly and inwardly into said float, movable block upon said arms, abutments above the dead center lines between the pivots of the arms within the float and pivots upon said frames to which said shock absorbers are connected to said frames and means for moving said blocks and said pivotal connections between the arms and shock absorbers either way through said dead center lines, against or away from said abutments.

4. In a retractable landing gear for airplanes provided with a float, said float being provided with pockets for housing the landing wheels when in retracted position, the combination of frames hinged to the float, a wheel and axle upon each of the frames, and means for moving said frames upwardly and inwardly for folding said wheels into said pockets, said means consisting of shock absorbers, and means for moving said shock absorbers downwardly and inwardly into said float, said means consisting of arms pivotally connected to the shock absorbers and float, movable blocks upon said arms, abutments above the dead center lines between the pivots of the arms within the float and the pivots upon said frames by which said shock absorbers are connected to said frames, and means for moving said blocks and said pivotal connections between the arms and shock absorbers either way through said dead center lines, against or away from sail abutments, said abutments being located above the dead center lines between said pivots within the float and the pivots upon the frames to which the shock absorbers are attached, in all positions of said wheels and frames with respect to said shock absorbers, when said wheels and frames are in operative position.

5. In a retractable landing gear for airplanes provided with a float, said float being provided with pockets for housing the landing wheels when in retracted position, the combination of frames hinged to the float, a wheel and axle upon each of the frames, and means for moving said frames upwardly and inwardly for folding said wheels into said pockets, said means consisting of absorbers, and means for moving said shock absorber downwardly and inwardly into said float, said means consisting of arms pivotally connected to the shock absorbers and float, movable blocks upon said arms, abutments above the dead center lines between the pivots of the arms within the float and the pivots upon said frames by which said shock absorbers are connected to said frames, and means for moving said blocks and said pivotal connections between the arms and shock absorbers either way through said dead center lines, against or away from said abutments, said abutments being located above the dead center lines between said pivots within the float and the pivots upon the frames to which the shock absorbers are attached, in all positions of said wheels and frames with respect to said shock absorbers, when said wheels and frames are in operative position, said means consisting of a cable connected to said movable blocks upon said arms for moving the blocks in either direction along said arms.

6. In a retractable landing gear for airplanes provided with a float, said float being provided with pockets for housing the landing wheels when in retracted position, the combination of frames hinged to the float, a wheel and axle upon each of the frames, and means for moving said frames upwardly and inwardly for folding the frames into the pockets, said means consisting of shock absorbers and means for moving said shock absorbers downwardly and inwardly into the float, said means comprising arms connecting the shock absorbers, and float, blocks movable along said arms and operable in guideways, abutments above the dead center lines between the points of connection of the arms to the float and the points of connection of the shock absorbers to the frames, and means for moving the blocks in the guideways causing the points of connection between the arms and shock absorbers to move relative to the abutments.

WILLIAM A. ABERG.